Aug. 28, 1928.  
E. DE H. STEEL  
1,682,584
MEANS FOR MOUNTING MIRRORS AND THE LIKE
Filed May 6, 1927
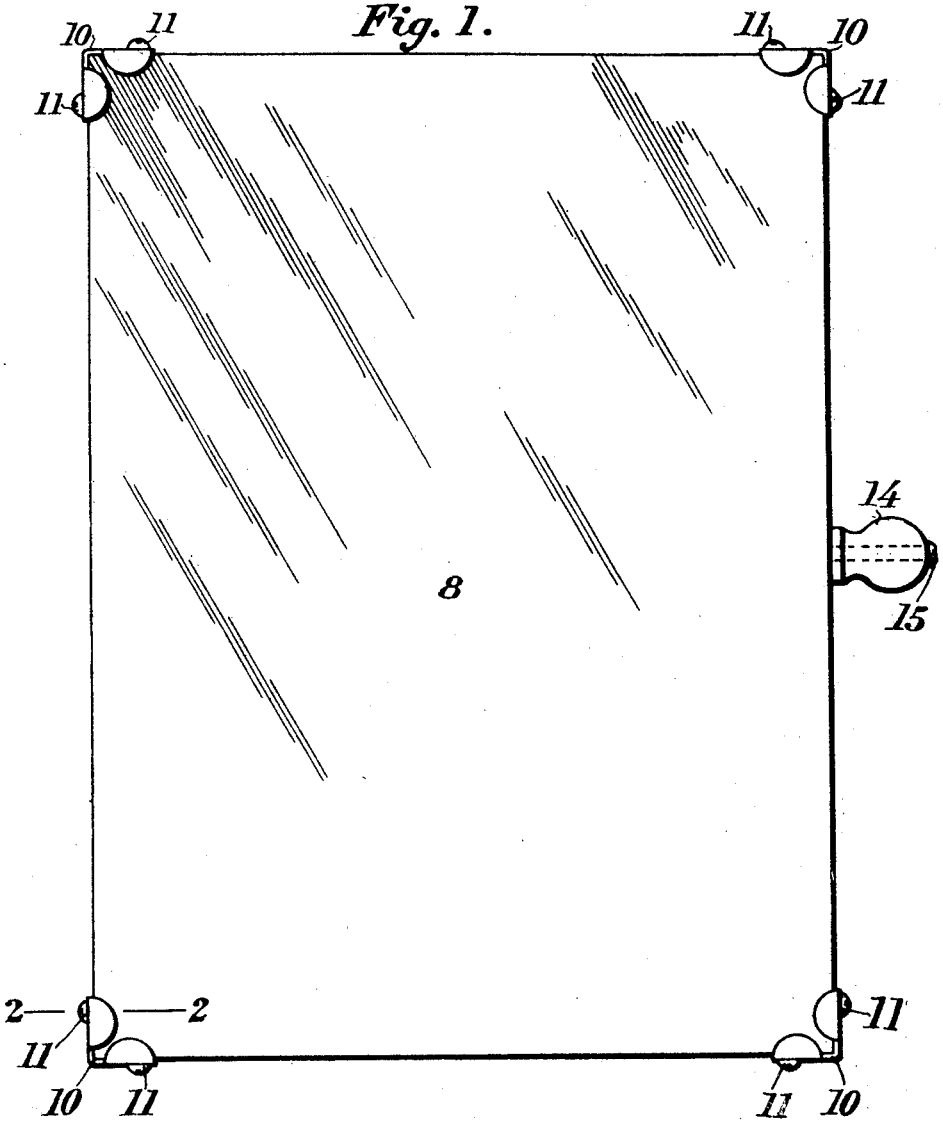
Fig. 1.
Fig. 2.
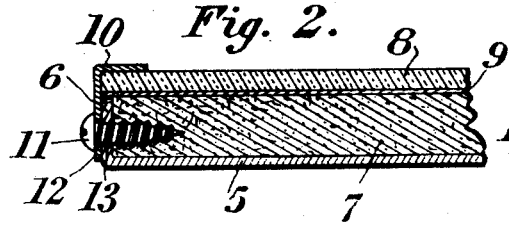
Inventor:
Edwin DeHaven Steel,
By Howson & Howson
Attorneys Patented Aug. 28, 1928.

1,682,584

UNITED STATES PATENT OFFICE.

EDWIN DE HAVEN STEEL, OF PHILADELPHIA, PENNSYLVANIA, ASSIGNOR TO STEEL & WIKE COMPANY, OF PHILADELPHIA, PENNSYLVANIA, A CORPORATION OF PENNSYLVANIA.

MEANS FOR MOUNTING MIRRORS AND THE LIKE.

Application filed May 6, 1927. Serial No. 189,336.

This invention relates to means for mounting mirrors and the like.

An object of the invention is to provide means for retaining glass mirrors so that substantially the entire surface thereof will be unobstructed.

Another object of the invention is to provide a mirror mounting that eliminates the use of a frame or other like holding device.

Another object is to produce durable strong and efficient means for retaining mirrors which may be economically constructed.

Other objects and advantages will hereinafter appear.

The views of the drawings are:—

Figure 1 is a plan of a mirror mounted according to the embodiment of my present invention;

Fig. 2 is a vertical transverse section taken on the line 2—2 of Fig. 1.

Referring to the drawings, the device comprises a pan 5 preferably formed from a sheet of suitable ductile metal. The edges of the metal are bent upwardly to provide sides 6. The pan can be made of any size or shape desired, and its sides 6 can be of any height desired.

A sheet of compressed fibrous material forming a filler 7 is placed in the pan. Any suitable material can be used for the filler, so long as such material is capable of providing a cushion back for the mirror. Preferably, the material should have a thickness in excess of the height of the sides of the pan 5, and an area sufficient to fit snugly within the pan.

Superposed on the filler 7 is a glass mirror 8 having its silvered surface 9 lying next to the filler and protected thereby.

The edges of the mirror 8 should extend slightly over the edges of the filler 7 and overlie the edges of the pan 5, in the manner shown in Fig. 2, so that when the parts are assembled, nothing but the mirror will be visible from the front.

The mirror 8 is fixed to the pan. For this purpose, I prefer to utilize brackets 10, which may be placed at each corner of the mirror.

Each bracket 10 comprises an angular body having a vertical side adapted to contact with the side of the pan and be securely fixed thereto, and a horizontal top flange adapted to overlie the mirror and retain the same in position with respect to the pan. As seen in Fig. 2, each bracket is, in vertical section L-shaped.

Means for fastening the brackets 10 to the pan include screws 11 that are passed through openings 12 in the sides of the brackets and openings 13 in the sides of the pan.

Preferably, the screws 11 are formed from hardened steel, and they have the entire length of their shanks threaded.

The openings 12 and 13 should be slightly less in diameter than the diameter of the screw shanks, so that when the screws are threaded into the sides of the device, the threads in the shanks of the screws will cut threads in the openings. Thus, the adjacent pieces of metal will be firmly joined together and the projecting portion of the screws will be imbedded in the filler 7.

The embodiment of my invention herein disclosed is particularly useful as a door for wall cabinets, in which the doors of such cabinets are provided with "clear view" mirrors. Heretofore in manufacturing devices of this character it has been the custom to drill holes through the mirrors and pass screws through such holes. However, due to fracturing of the glass when the holes were being drilled, wall cabinets having "clear view" mirrors of the prior construction have been extremely expensive to manufacture. By my invention, the mirrors may be retained firmly in a suitable back by brackets arranged at each corner of the mirror and fastened to the back by screws. Such construction has cheapened the cost of manufacturing mirrored doors for wall cabinets several hundred percent.

When the device is used as a door for wall cabinets, hinges (not shown) can be fastened to one side of the pan 5, while a knob 14 can be fastened to the opposite side of the pan by means of a screw 15, similarly to the method used for securing the brackets 10.

The invention set forth herein is of course, susceptible of various modifications and adaptations.

The invention claimed is:—

1. Means for mounting mirrors, including a pan having a rim formed on its edges, a cushion in said pan, a mirror superposed on said cushion and slightly overlapping the same, the outside edges of the mirror forming a substantial continuation of the outside edges of the rim, and brackets engaging the edges of said mirror and fixed to said pan.

2. Means for mounting mirrors and the like comprising a pan having upturned sides, a mirror overlying the pan and spaced from the bottom thereof and having its edges substantially coincidental with the outermost edges of said upturned sides, a filler interposed between said pan and mirror, and means engaging said mirror and secured to the sides of said pan for rendering the parts in fixed relation with each other so that a substantially "clear-view" mirror is produced.

EDWIN DE HAVEN STEEL.